United States Patent
Yuen

(10) Patent No.: US 7,171,204 B2
(45) Date of Patent: Jan. 30, 2007

(54) METHOD FOR HANDLING A CALL ESTABLISHMENT REQUEST DURING LOCATION MANAGEMENT IN 3G WIRELESS NETWORKS

(75) Inventor: Steven Tsan-Ying Yuen, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 754 days.

(21) Appl. No.: 10/255,359

(22) Filed: Sep. 26, 2002

(65) Prior Publication Data

US 2003/0073437 A1   Apr. 17, 2003

Related U.S. Application Data

(60) Provisional application No. 60/329,846, filed on Oct. 16, 2001.

(51) Int. Cl.
*H04Q 7/20* (2006.01)
(52) U.S. Cl. .................. 455/436; 455/432.1; 455/450; 455/509; 370/329; 370/331
(58) Field of Classification Search ............ 455/404.2, 455/456.1, 436, 502
See application file for complete search history.

(56) References Cited

U.S. PATENT DOCUMENTS 6,807,419 B1 * 10/2004 Laiho et al. ................ 455/436

| | | | |
|---|---|---|---|
| 2003/0003919 A1 * | 1/2003 | Beming et al. | 455/446 |
| 2003/0013446 A1 * | 1/2003 | Haumont et al. | 455/436 |
| 2004/0219938 A1 * | 11/2004 | Parantainen et al. | 455/502 |

FOREIGN PATENT DOCUMENTS

| WO | WO 01/39534 A1 | 5/2001 |
|---|---|---|
| WO | WO 01/41493 A1 * | 7/2001 |

OTHER PUBLICATIONS

European Telecommunications Standards Institute Universal Mobile Telecommunications Systems (UMTS); UTRAN Iu Interface RANAP Signalling 3GPP TS 25.413, V.4.2.0, Release 4, Sep. 2001.

* cited by examiner

*Primary Examiner*—Temica Beamer
*Assistant Examiner*—Joy Contee
(74) *Attorney, Agent, or Firm*—Kevin D. Wills

(57) ABSTRACT

A method of handling call establishment requests when a MS moves from one Serving Radio Network Controller (SRNC) to another SRNC in a 3G wireless network, such as a UMTS network. If SRNC Relocation is being prepared, an Iu connection request and Paging request received by the SRNC are suspended and stored in a buffer. If the Relocation procedure completes successfully, the messages are discarded. If the Relocation procedure fails or is cancelled, the messages are processed normally. However, if SRNC Relocation has already been triggered, all call establishment messages (except Direct Transfer Messages) received by the SRNC are ignored. Other post Iu connection messages received by the SRNC are processed instead of potentially being ignored.

10 Claims, 8 Drawing Sheets

METHOD FOR HANDLING A CALL ESTABLISHMENT REQUEST DURING LOCATION MANAGEMENT IN 3G WIRELESS NETWORKS

REFERENCE(S) TO RELATED APPLICATION(S)

The present application claims priority from provisional application, Ser. No. 60/329,846, entitled "METHOD FOR HANDLING A CALL ESTABLISHING REQUEST DURING LOCATION MANAGEMENT IN 3G WIRELESS NETWORKS," filed Oct. 16, 2001, which is commonly owned and incorporated herein by reference in its entirety.

FIELD OF THE INVENTION

The present invention relates generally to the field of communication systems, and more particularly, to a method for handling call establishment and post establishment requests during location management in 3g wireless networks.

BACKGROUND OF THE INVENTION

Current 3GPP standards are lacking in specifications for how a serving Radio Network Controller (RNC) in a Universal Mobile Terrestrial System (UMTS) handles call establishment and post establishment requests during serving RNC Relocation. Section 8.6.2 of 3GPP TS 25.413 version 3.5 (2001–03): UTRAN Iu Interface RANAP Signaling (hereinafter referred to as 25.413) specifies only that if a Radio Access Network Application Part (RANAP) message arrives from the core network (CN), the serving RNC either processes the message as soon as possible or ignores the message. A copy of 25.413 can be obtained via the world wide web at http://www.3gpp.org/ftp/Specs/2001–06/R1999/25_series/. 25.413 is incomplete for both User Equipment (UE) originated and terminated call establishment. If a call establishment request message is processed immediately and an Iu connection is established, resources may be wasted if the connection is relocated (i.e., released) later on. On the other hand, if the message is ignored, and serving RNC Relocation is cancelled later, call blocking may increase.

U.S. Pat. No. 6,225,944 issued to Stephen Hayes on May 1, 2001 describes a method of reporting the location of a MS. However, the patent does not address MS mobility and serving RNC Relocation. U.S. Pat. No. 6,263,203 issued to Alfed Jahn on Jul. 17, 2001 describes a method for seamless handover of a connection from a switch to a MS via two base stations. The patent provides a general relocation mechanism between two base stations, but it does not address the interaction between call connection and serving RNC Relocation. U.S. Pat. No. 6,137,783 issued to Krister Sallberg on Oct. 24, 2000 describes a system and method for reducing the transfer of mobility management information. However, the patent does not address the mobility issue that requires the relocation of the RAN-CN Network (CN) interface. Finally, U.S. Pat. No. 5,953,667 issued to Hanna-Maria Kauppi on Sep. 14, 1999 describes a method to reduce paging time in a cellular network. The patent does not address the handling of call establishment request messages during serving RNC Relocation.

Thus, there is a need for a method of handling call establishment and post establishment requests during location management.

DETAILED DESCRIPTION OF THE DRAWINGS

Figure 1:
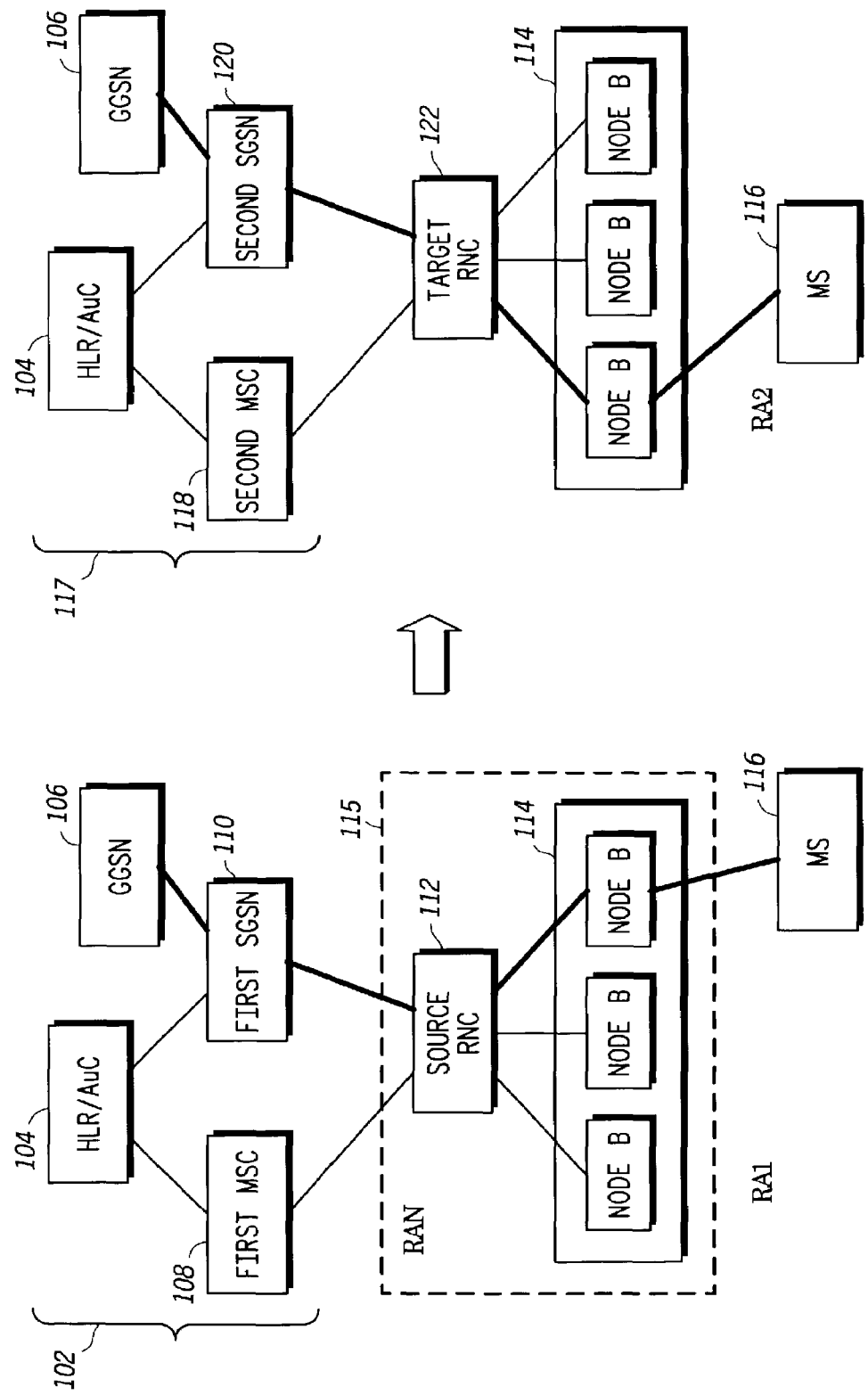
FIG. 1 is a block diagram of a simplified UMTS that can be used with the preferred embodiment of the present invention.

The present invention provides a method of handling call establishment and post establishment requests when a mobile station (MS) moves from one Serving RNC (SRNC) to another SRNC in a 3G wireless network, such as a UMTS network. Referring to FIG. 1, the method is implemented in the RNC 112 by any microprocessor or computer commonly known in the art. The method specifies that if SRNC Relocation is being prepared, an Iu connection request received by the SRNC is suspended and stored in a buffer. If the Relocation procedure completes successfully, the message is discarded. If the Relocation procedure fails or is cancelled, the message is processed normally. If an uplink (UL) Direct Transfer or Common ID message is received during Relocation Preparation, the message is processed immediately (instead of ignored).

The method further specifies that if SRNC Relocation is in any stage of processing (not just Preparation), a Paging request received by the SRNC is suspended and stored in a buffer. If the Relocation procedure completes successfully, the message is discarded. If the Relocation procedure fails or is cancelled, the message is processed normally.

If the RNC needs to initiate the release of a Radio Access Bearer (RAB) or an Iu connection while SRNC Relocation is being prepared, the RNC first cancels the Relocation procedure before sending the RAB Release Request or Iu Release Request message to the CN. In accordance with the invention, the RNC sends Overload Control and Error Indication messages to the CN regardless of the stage of the Relocation procedure. After the Relocation Preparation procedure completes successfully, all uplink (UL) and downlink (DL) signaling messages (except the IU RELEASE COMMAND message) received for the same Iu signaling bearer is ignored by the source RNC. However, in the case of "UE not involved" Relocation (Relocation not involving user equipment), the DL DIRECT TRANSFER messages that have not been sent via air interface are sent from the source SRNC to the target SRNC immediately using the Relocation Information message. All messages discussed in this document are defined in Section 9.1 of 25.413, which is incorporated by reference herein.

Turning now to FIG. 1, as known in the art, there is generally depicted a UMTS 100 having a CN designated generally as 102, in communication with a MS 116 through a source RNC 112 and a plurality of Node Bs 114. The source RNC 112 and Node Bs 114 make up the Radio Access Network (RAN) 115. The CN 102 includes a Home Location Register/Authentication Center (HLR/AuC) 104 connected to a first Mobile Station Controller (MSC) 108 mainly for servicing voice subscribers. The HLR/AuC 104 is connected to a first Serving GSM Packet Radio Service Support Node (SGSN) 110 for servicing both data and voice subscribers. The first SGSN 110 is connected to a Gateway GPRS Support Node (GGSN) 106 that includes information necessary for appropriate routing of data messages. Both the first MSC 108 and first SGSN 110 are connected to the source serving RNC 112, which supports a group of Node Bs 114.

The dark lines in the left half of FIG. 1 indicate an established connection between the MS 116 and its SGSN 110. The link between the source serving RNC 112 and the SGSN 110 is an Iu signaling connection. The source serving RNC 112 terminates the Iu connection of the MS 116. As the MS 116 moves from Routing Area 1 (RA1) to Routing Area 2 (RA2), the serving RNC may be relocated to optimize the signaling connection between the MS 116 and CN 117. As shown in the right half of FIG. 1, after Relocation, the Iu instance associated with the MS 116 is changed and the target RNC 122 becomes the serving RNC. Now, the target serving RNC 122 is connected to a second MSC 118 and a second SGSN 120. The newly established MS-to-SGSN connection is denoted by another set of dark lines.

FIG. 1 shows the MS 116 relocating from RA1 to RA2. After the source RNC 112 initiates the Relocation procedure, the procedure is in the preparation stage. The Relocation procedure waits for resource allocation in the target RNC 122 and responses from the CN 102. If a call establishment request is received by the source RNC 112 during this waiting period, an ambiguous situation arises. The source RNC 112 must decide whether to continue processing the call establishment messages or ignore them. An incorrect decision will likely result in inefficient use of RNC resources or high call blocking.

Figure 2:
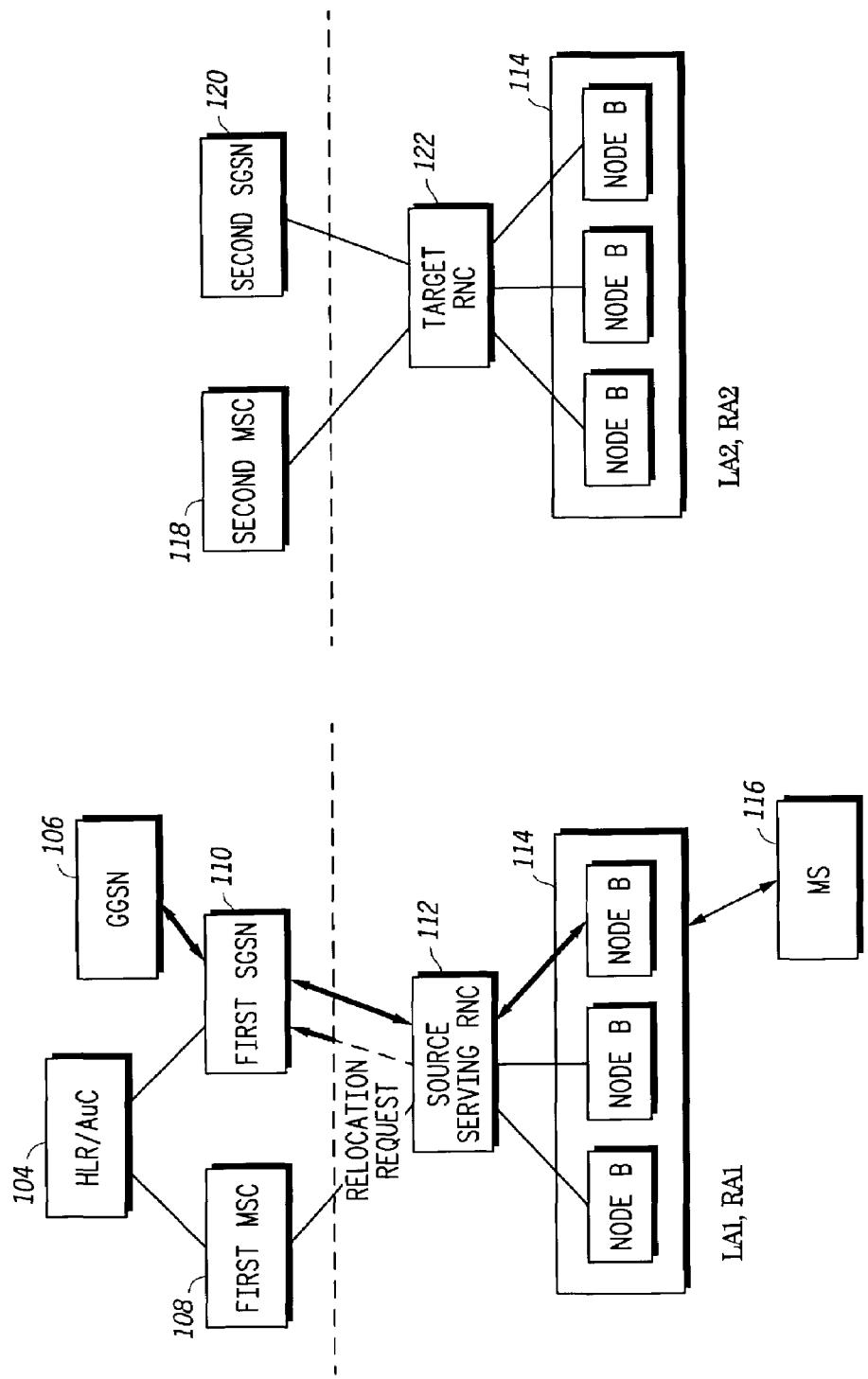
FIG. 2 is a block diagram of the UMTS of FIG. 1 wherein the Serving RNC is in the Relocation Preparation stage.
Figure 3:
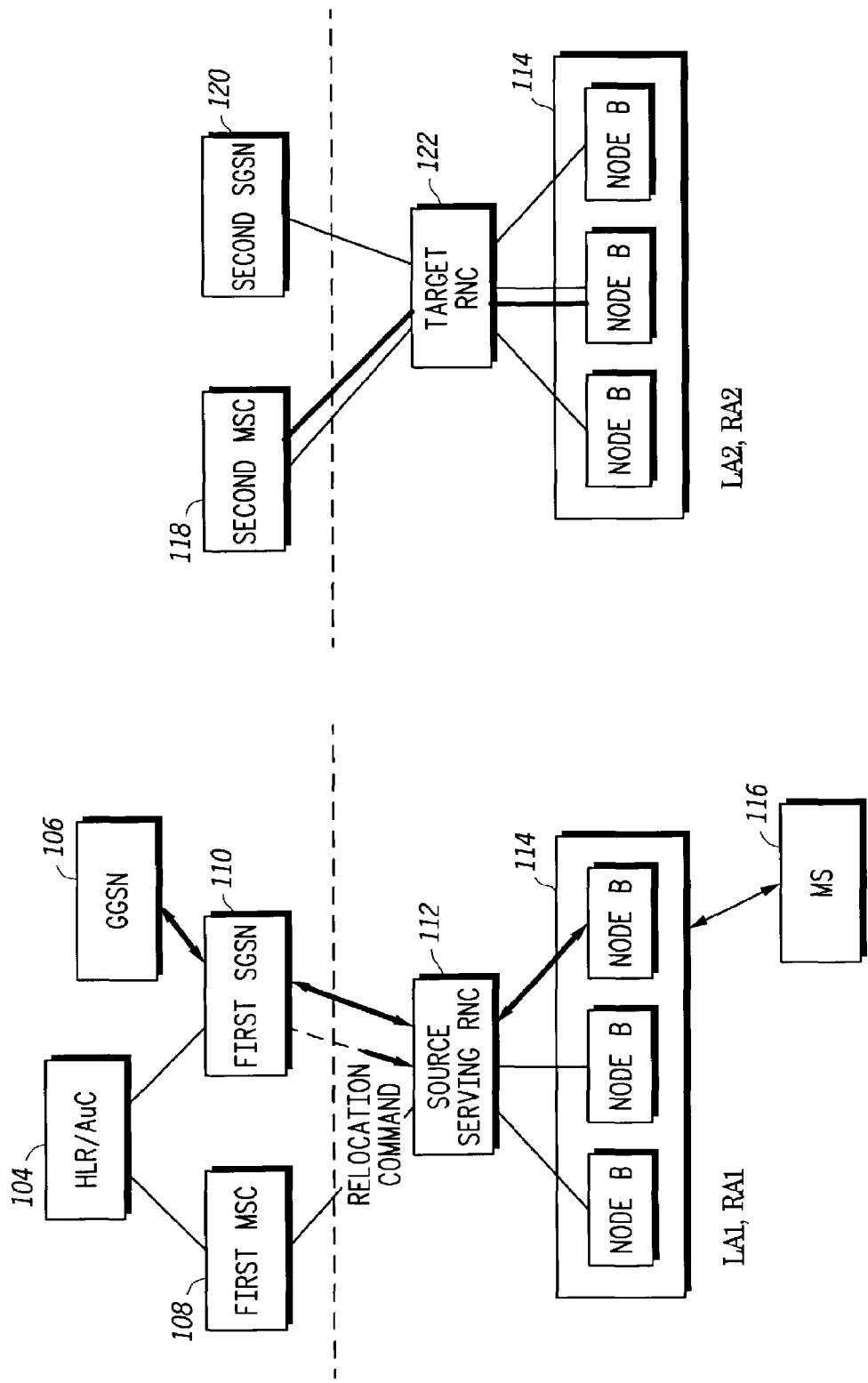
FIG. 3 is a block diagram of the UMTS of FIG. 1 wherein the Serving RNC is in the Relocation Prepared stage.

The serving RNC Relocation procedure has essentially two stages: Relocation Preparation and actual relocation of control and user planes. When the serving RNC 112 of FIG. 1 sends a RANAP Relocation Required message to the CN 102 and waits for a response, the serving RNC 112 is in the Relocation Preparing stage, as shown in FIG. 2 (with like reference numerals repeated). When the serving RNC 112 receives a RANAP Relocation Command message from the CN 102, Relocation Preparation is successfully completed. The serving RNC 112 begins releasing its "serving" responsibility and relocates the user and control plane to the target RNC 122. Also, the radio link between the MS 116 and the target RNC 122 is established. This is shown in FIG. 3.

Figure 4:
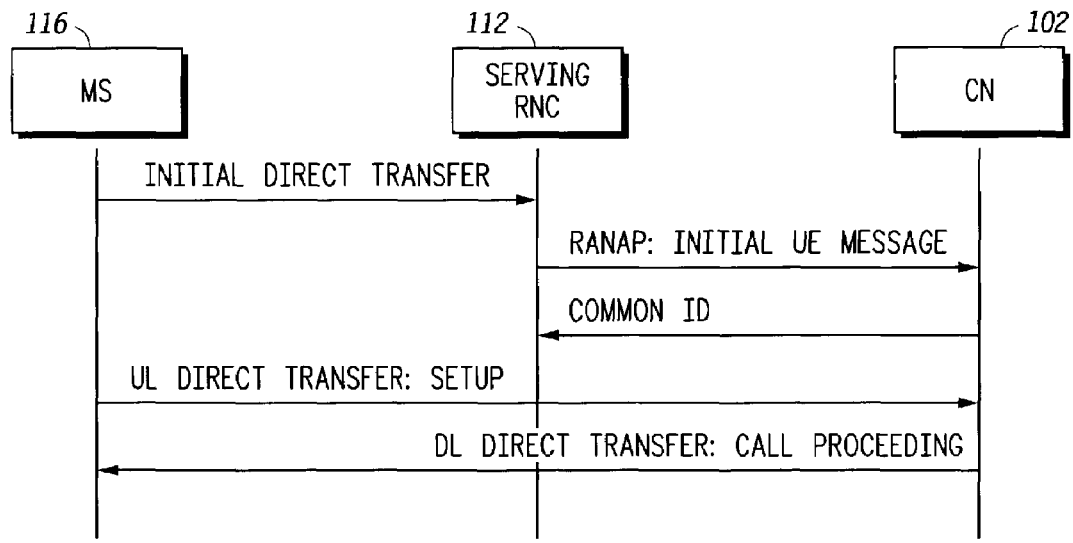
FIG. 4 is a message flow diagram of MS originated call establishment
Figure 5:
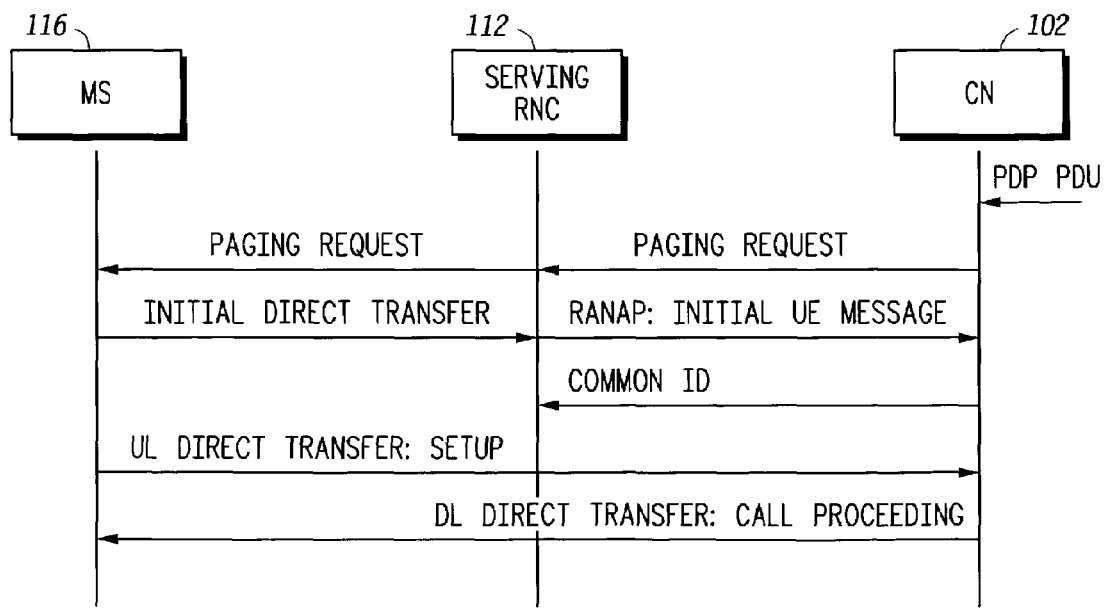
FIG. 5 is a message flow diagram of MS terminated call establishment

In a MS originated call establishment request, the MS 116 sends a signaling establishment request to the CN 102 via the RNC 112. As shown in FIG. 4, the MS sends an Initial Direct Transfer Message to the source RNC 112 which then sends a RANAP Initial UE message to the CN 102 to establish an Iu signaling connection. After the Iu connection is successfully established, the MS 116 exchanges signaling information with the SGSN 110 using the Direct Transfer messages and Common ID procedure to set up a call. In a MS 116 terminated call establishment, the CN 102 receives Packet Data Protocol/Protocol Data Unit (PDP/PDU) information sent from a remote user to a MS 116 registered in the CN 102. The CN 102 then pages the MS 116 via the serving RNC 112 to ask the MS 116 to initiate call establishment, as shown in FIG. 5.

In both scenarios of call establishment, it does not make sense to establish a new Iu connection that may be relocated later. However, if for any reason the SRNC is not relocated, the call connection request should still be processed. The competitive market place dictates that RNCs must be designed to handle resources efficiently and to reduce call blocking to a minimum. FIGS. 6–9 are flow charts illustrating a method of handling various call establishment and post call establishment messages during various stages of SRNC Relocation.

Figure 6:
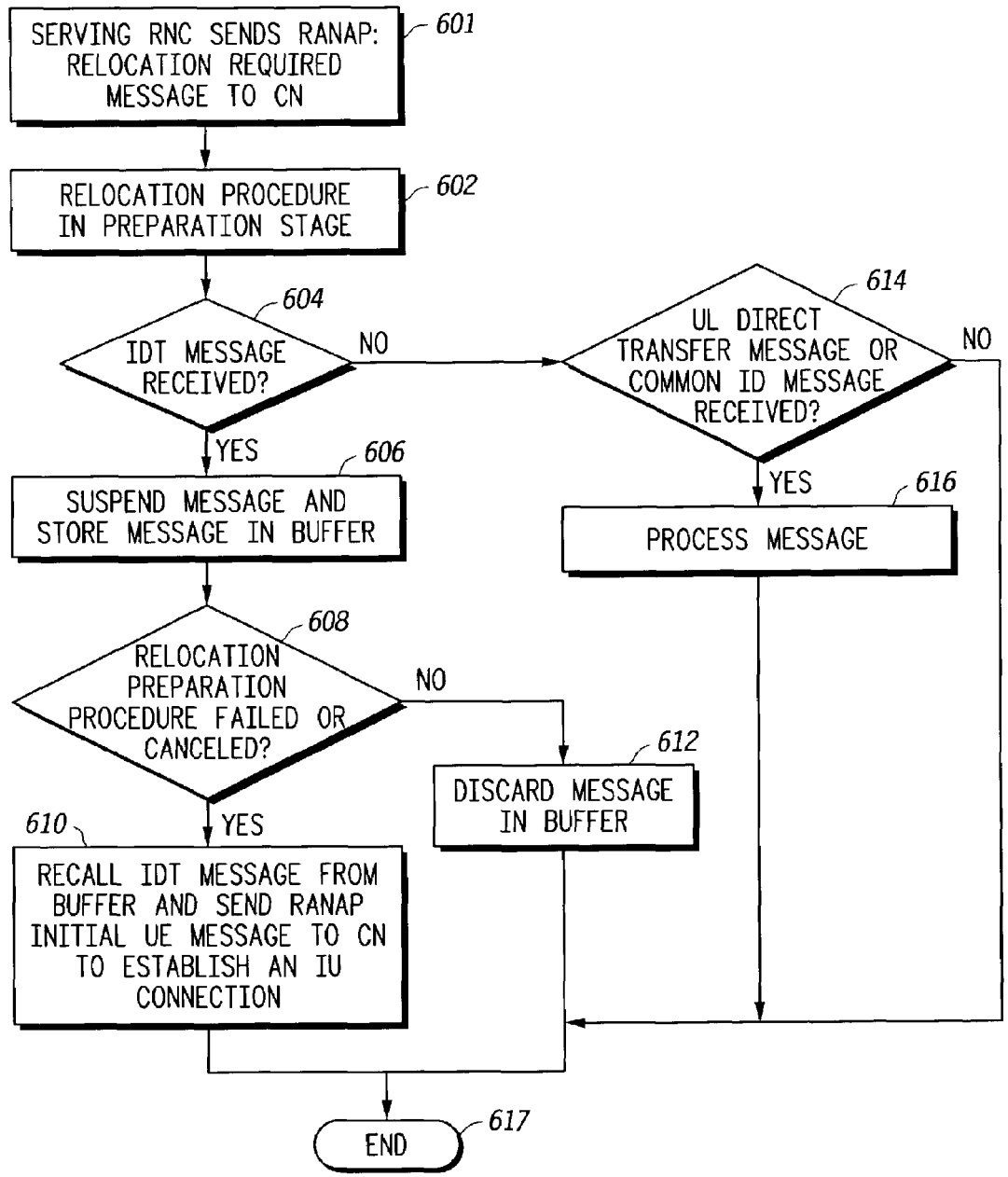
FIG. 6 is a flow chart illustrating how the serving RNC 112 handles an Initial Data Transfer message, a UL Direct Transfer message or a Common ID message during Relocation Preparation.

Turning to FIG. 6, a flow chart illustrating how the serving RNC 112 handles an Initial Data Transfer (IDT) message, a UL Direct Transfer message or a Common ID message during Relocation Preparation. The method begins at step 601 where the serving RNC 112 sends a RANAP: Relocation Required message to the CN 102 (FIG. 1). At step 602, the Relocation procedure is in the preparation stage. At step 604, the method determines whether an IDT message was received. If the answer is yes, the message is suspended and stored in a buffer (step 606). (As shown in FIG. 1, the MS 116 typically has two Iu connections, Iu-CS to the MSC 108 and Iu-PS to the SGSN 110.) If the Relocation Preparation procedure fails or is cancelled by the CN 102 (step 608), the IDT message is recalled from the buffer and a RANAP Initial UE Message is sent to the CN 102 to set up an Iu connection (step 610). However, if Relocation is prepared successfully, the Iu connection to be set up will likely be relocated, and thus the message in the buffer is discarded (step 612). At step 617, the method ends.

Referring back to step 604, if an IDT message was not received, the method determines whether an UL Direct Transfer message or a Common ID message was received. If either message was received, the message is immediately processed (step 616). If neither message was received, the method ends (step 617).

Figure 7:
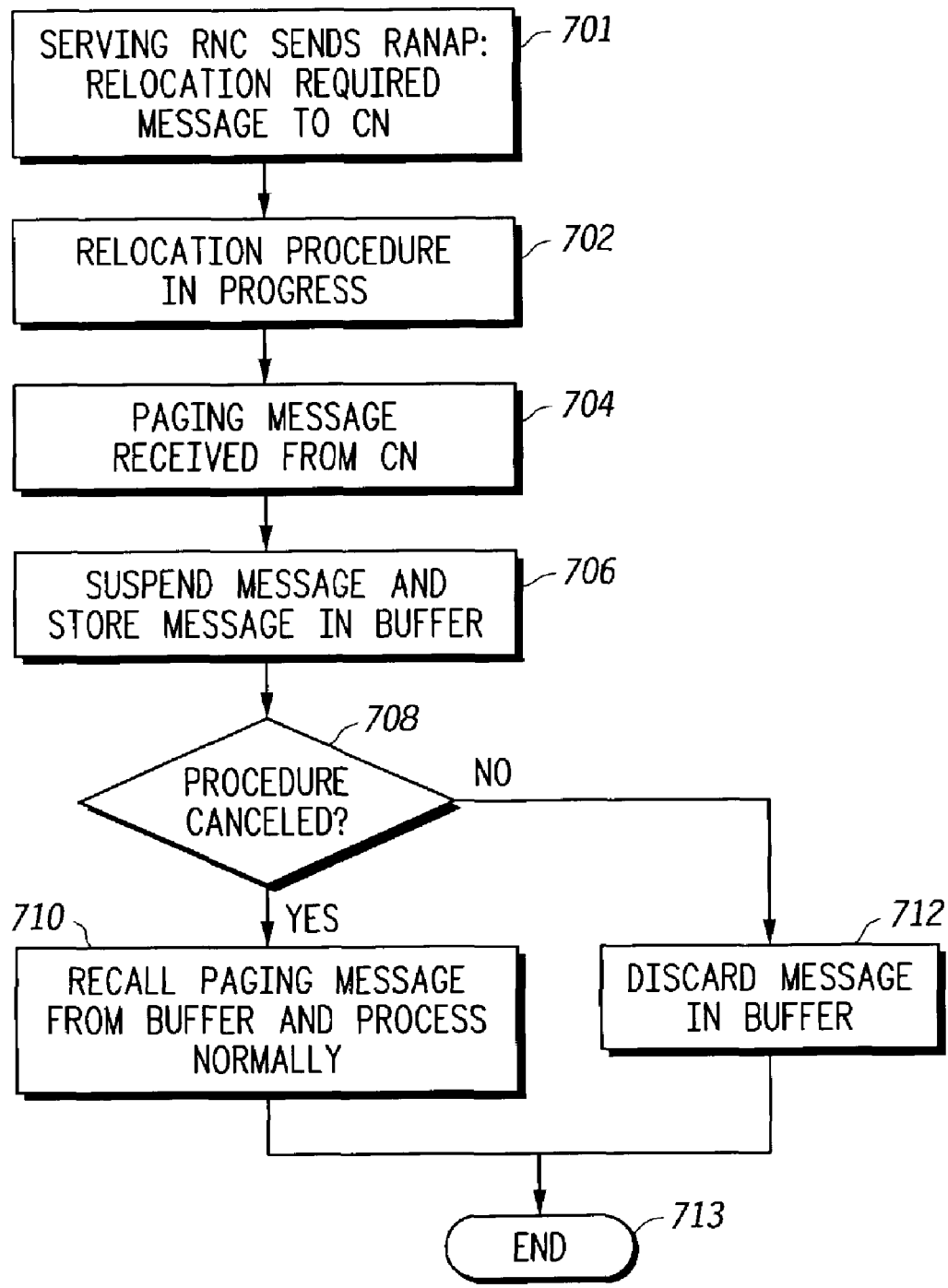
FIG. 7 is a flow chart illustrating how the serving RNC 112 handles a Paging message while Relocation is in progress.

FIG. 7 is a flow chart illustrating how the serving RNC 112 handles a Paging message while Relocation is in progress. For network originated call establishment, the CN 102 (FIG. 1) pages the MS 116. The method begins at step 701 where the serving RNC 112 sends a RANAP: Relocation Required message to the CN 102. At step 702, the Relocation procedure is in progress. At step 704, the serving RNC 112 receives a Paging message from the CN 102, and at step 706, the message is suspended and stored in a buffer. If the Relocation is later cancelled, the Paging message is retrieved from the buffer and processed normally (steps 708 and 710). If the Relocation completes successfully, the Paging message is discarded (step 712) because that RNC 112 is no longer the Serving RNC. The method ends at step 713. Note that the message suspension approach is similar to that in FIG. 6, but the message is suspended during the entire Relocation life cycle, not just Relocation Preparation.

Figure 8:
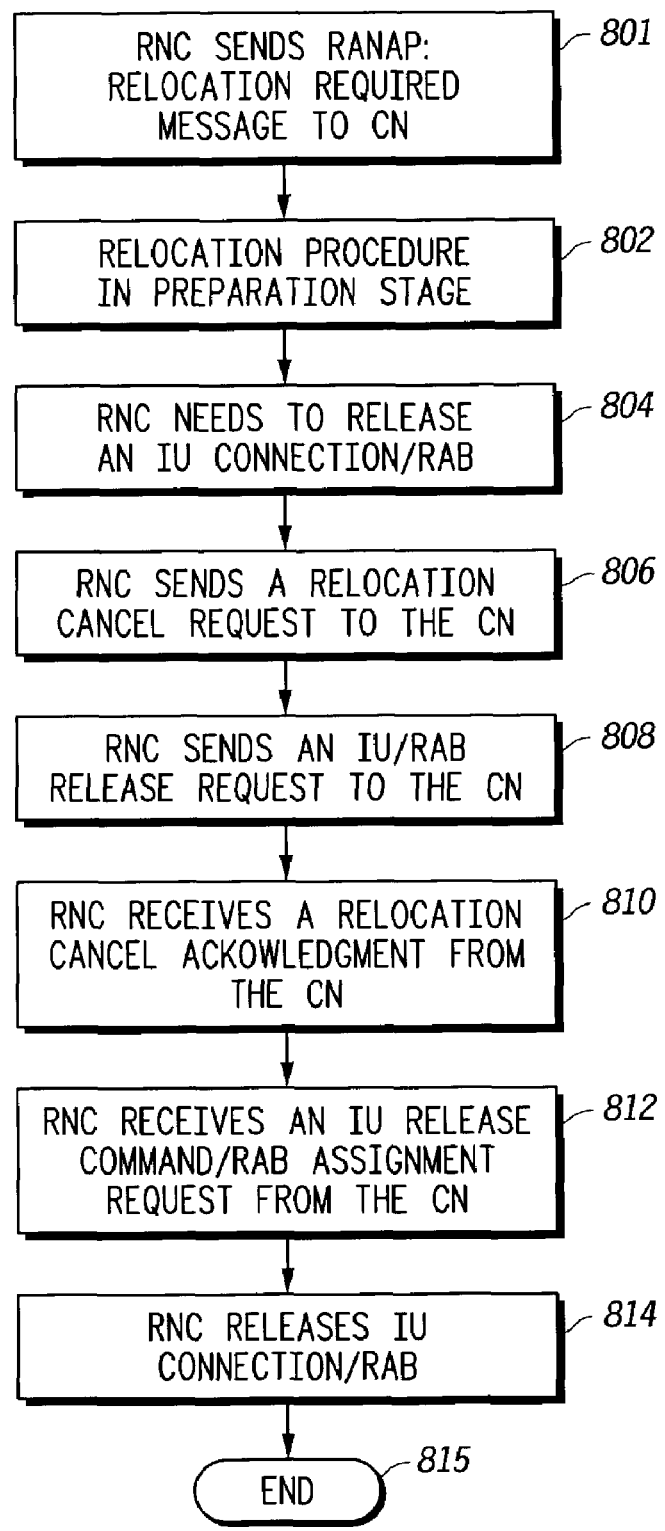
FIG. 8 is a flow chart illustrating how the serving RNC 112 handles an Iu Release Request or RAB Release Request while Relocation Preparation is in progress.

Turning to FIG. 8, a flow chart illustrating how the serving RNC 112 handles an Iu Release Request or RAB Release Request while Relocation Preparation is in progress is shown. The method beings at step 801 where the RNC 112 sends a RANAP: Relocation Required message to the CN 102 (FIG. 1). At step 802, the Relocation procedure is in the preparation stage. At step 804, the serving RNC 112 determines a need to release an Iu connection or RAB and at step 806, sends a Relocation Cancel request to the CN 102. At step 808, the serving RNC 112 sends an Iu Release Request or RAB Release Request to the CN 102. At step 810, the serving RNC 112 receives a Relocation Cancel Acknowledgement from the CN 102. At step 812, the serving RNC 112 receives an Iu Release Command or RAB Assignment Request from the CN 102. Finally, at step 814, the serving RNC 112 releases the Iu connection or RAB and the method ends (step 815).

The serving RNC 112 performs overload control and error processing regardless of the stage of Relocation. When a resources overload condition or error condition is detected, the serving RNC 112 sends the appropriate message (i.e., RANAP: Overload, RANAP: Error Indication) to the CN 102.

Figure 9:
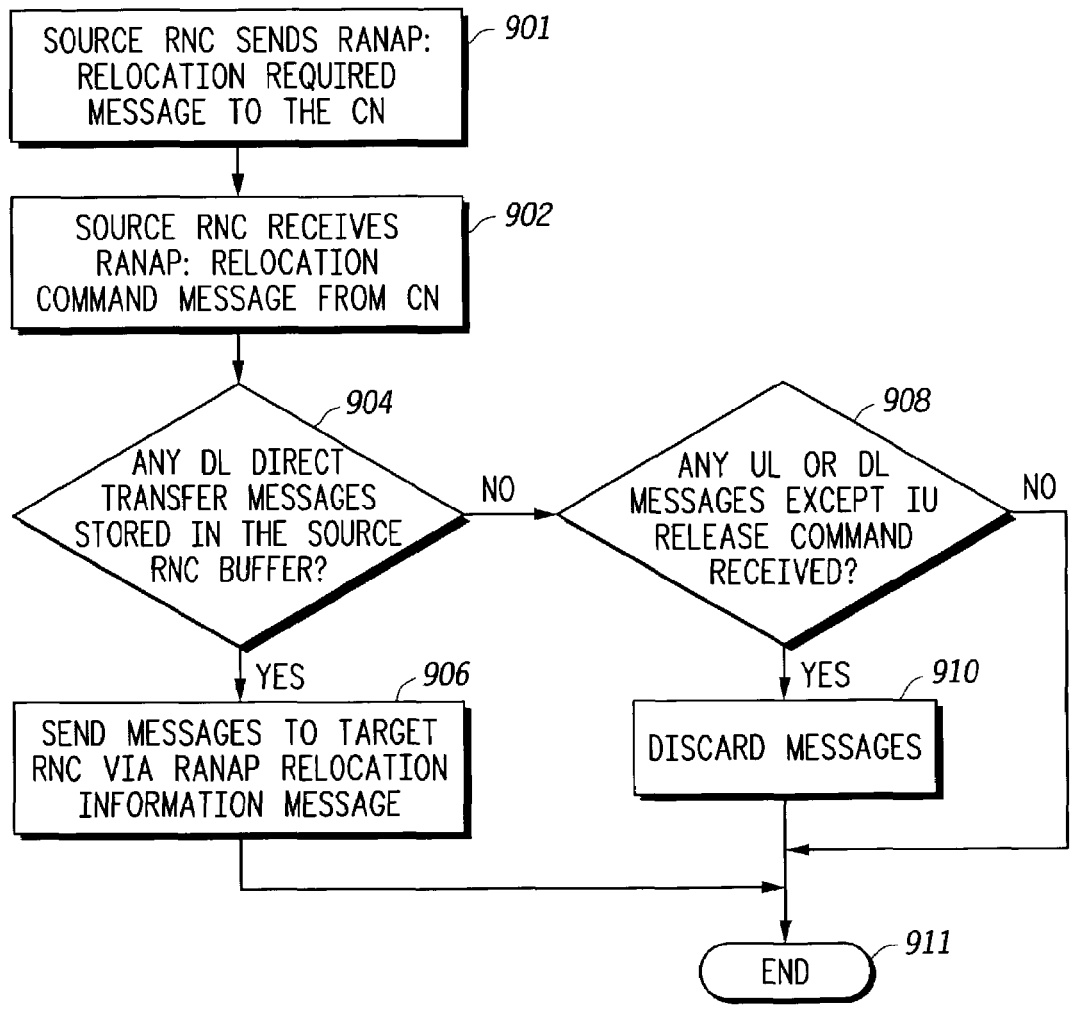
FIG. 9 is a flow chart illustrating how the serving RNC 112 handles Call Establishment/Release after Relocation has been prepared.

FIG. 9 is a flow chart illustrating how the serving RNC 112 handles Call Establishment/Release after Relocation has been prepared. The method begins at step 901 where the serving RNC 112 sends a RANAP: Relocation Required message to the CN 102 (FIG. 1). At step 902, the RNC 112 receives a RANAP: Relocation Command message from the CN, which signals that the Relocation Preparation has completed successfully. At step 904, the method determines whether any DL Direct Transfer messages are stored in the buffer of the source RNC 112. If the answer is yes, at step 906, the method sends the stored messages to the Target RNC 122 via a RANAP: Relocation Information message and proceeds to step 908. If the answer is no, at step 908, the method determines whether any DL or UL messages (except Iu Release Command) have been received. If the answer is yes, the messages are discarded (step 910) and the method ends (step 911). If the answer is no, the method ends.

The present invention avoids inefficient routing of user data in the RAN and reduces call blocking. The invention addresses an area in 3G location management where current procedures are ambiguous and/or incomplete.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a communication system having a core network and a serving radio network controller SRNC, a method of processing a call establishment request during the SRNC's Relocation procedure wherein the procedure is in a preparation stage, the method comprising:
receiving a message;
determining the message type;
if the message type is a first type,
suspending the message;
storing the message in a buffer
determining whether the Relocation preparation completed successfully;
if the Relocation preparation completed successfully, discarding the message;
if the Relocation preparation failed or was cancelled, retrieving the message from the buffer; and
sending a RANAP Initial UE message to establish an Iu connection
if the message type is a second type, processing the message immediately.

2. The method of claim 1 wherein the first type is an Initial Data Transfer message.

3. The method of claim 1 wherein the second type is an Uplink Direct Transfer message.

4. The method of claim 1 wherein the second type is a Common Identification message.

5. In a communication system having a core network and a serving radio network controller SRNC, a method of processing a call establishment request during the SRNC's Relocation procedure comprising:
receiving a message;
determining the message type;
suspending the message;
storing the message in a buffer;
determining whether the Relocation procedure completed successfully;
if the Relocation procedure completed successfully, discarding the message;
if the Relocation procedure failed or was cancelled, retrieving the message from the buffer; and
processing the message.

6. The method of claim 5 wherein the message type is a Paging message.

7. In a communication system having a core network and a serving radio network controller SRNC, a method of processing a post call establishment request during the SRNC's Relocation procedure wherein the procedure is in a preparation stage, the method comprising:
sending a Relocation cancel request to the core network;
sending a release request to the core network;
receiving a Relocation cancel acknowledgment; and
completing the post call establishment request.

8. The method of claim 7 wherein the step of completing the post call establishment request comprises:
receiving an Iu release command; and
releasing an Iu connection.

9. The method of claim 7 wherein the step of completing the post call establishment request comprises:
receiving a radio access bearer assignment request; and
releasing the radio access bearer.

10. In a communication system having a core network, a source serving radio network controller (SRNC) and a target SRNC, a method of processing a Call establishment or release request after Relocation has been prepared comprising:
receiving a Relocation Command message;
sending any Downlink Direct Transfer messages stored in the source RNC to the target RNC; and
discarding any downlink or uplink messages except Iu release command messages.

\* \* \* \* \*